(12) United States Patent
Le et al.

(10) Patent No.: US 10,262,447 B2
(45) Date of Patent: Apr. 16, 2019

(54) SYSTEMS AND METHODS FOR VIRTUAL ENTITY ANIMATION

(71) Applicant: DISNEY ENTERPRISES, INC., Burbank, CA (US)

(72) Inventors: Binh H. Le, Burbank, CA (US); Jessica Hodgins, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/282,139

(22) Filed: Sep. 30, 2016

(65) Prior Publication Data

US 2018/0096510 A1    Apr. 5, 2018

(51) Int. Cl.
*G06T 13/40* (2011.01)
*G06F 3/0486* (2013.01)
*G06F 3/0484* (2013.01)

(52) U.S. Cl.
CPC .......... *G06T 13/40* (2013.01); *G06F 3/0486* (2013.01); *G06F 3/04842* (2013.01); *G06T 2207/20044* (2013.01); *G06T 2207/20092* (2013.01)

(58) Field of Classification Search
CPC .......... G06T 13/40; G06T 2207/20092; G06F 3/0481
See application file for complete search history.

(56) References Cited

U.S. PATENT DOCUMENTS

| 6,118,459 A * | 9/2000 | Hunter | G06T 13/80 345/473 |
| 2003/0137515 A1* | 7/2003 | Cederwall | G06T 13/40 345/473 |
| 2017/0032055 A1* | 2/2017 | Eisemann | G06F 17/10 |
| 2017/0032560 A1* | 2/2017 | Dionne | G06T 13/40 |

OTHER PUBLICATIONS

Ladislav Kavan; Geometric Skinning with Approximate Dual Quaternion Blending; ACM Transactions on Graphics (TOG) TOG Homepage archive vol. 27 Issue 4, Oct. 2008; Article No. 105.*
Ladislav Kavan;Spherical blend skinning: a real-time deformation of articulated models; Proceeding I3D '05 Proceedings of the 2005 symposium on Interactive 3D graphics and games; pp. 9-16; Washington, District of Columbia—Apr. 03-06, 2005.*
Ladislav Kavan;Spherical blend skinning: a real-time deformation of articulated models; Proceeding I3D '05 Proceedings of the 2005 symposium on Interactive 3D graphics and games; pp. 9-16; Washington, District of Columbia—Apr. 3-6, 2005 (Year: 2005).*

* cited by examiner

*Primary Examiner* — Gregory J Tryder
*Assistant Examiner* — Michael Le
(74) *Attorney, Agent, or Firm* — Esplin & Associates, PC (57) ABSTRACT

Systems and methods of virtual entity animation are presented herein. A virtual entity may have virtual skin defined by a model having a set of vertices. A skeletal-based skin deformation method of animation may be used wherein individual vertices in the model may have individually and independently determined centers of rotation.

16 Claims, 3 Drawing Sheets

SYSTEMS AND METHODS FOR VIRTUAL ENTITY ANIMATION

FIELD OF THE DISCLOSURE

This disclosure relates to virtual entity animation.

BACKGROUND

Virtual entities, such as virtual characters, may be modeled by a bone structure and an exterior "skin" that deforms as bones bend around joints. Skin deformation methods, sometimes referred to as "skinning algorithms," may dictate the way in which the skin reacts to bone movement. Skin deformation methods that work across a broad range of character designs and poses may be implemented to create compelling animations. Linear blend skinning (LBS) and dual quaternion skinning (DQS) are some methods. These and other skin deformation methods may be used for real-time applications. Both techniques may be efficient to compute and may be effective for many purposes. However, they may cause artifacts in the skin deflection, such as collapsing joints, a candy wrapper twist, and/or bulging around joints.

SUMMARY

One aspect of the disclosure relates to a system configured for virtual entity animation. Skin deformation methods may be used generate high-quality, detailed deformations around the joints of virtual entities from a small set of controllers. Among the available methods, skeletal-based methods may be used. Generally, skeletal-based methods may employ a simplified version of the anatomical skeleton (e.g., virtual bones connected by joints) as a controller. The virtual entity may be deformed by rotating the bones around its joints. Individual bones may propagate their transformation to the skin surface that it supports. The skin deformation typically appears near the joints where an area of the surface is influenced by the transformations of two or more bones.

Although LBS and DQS techniques are widely used skin deformation methods, they also create artifacts in deformation quality, particularly for certain poses. Two well-known artifacts of LBS are a joint collapse and a candy wrapper twist due to the volume loss caused by the linear blending. DQS may eliminate these two artifacts, but it introduces a joint bulging artifact because DQS interpolates rotations about centers of rotation that are set as the positions of the joints. This disclosure proposes a solution to the skinning problem that avoids artifacts. At least one approach uses two assumptions: local transformations should be rigid (orthogonal), and vertices with similar skinning weights should follow similar transformations. In particular, the disclosure proposes a technique to determine individual centers of rotation for individual vertices on the virtual skin of a virtual entity. The centers of rotation may have positions that may or may not lie on a joint of two or more bones as used for the DQS approach. The centers of rotation may be determined from a rest pose of the virtual entity and using skinning weights of the vertices on the skin and/or other information. The centers of rotation may be cached and a per-vertex transformation may be calculated at runtime.

In some implementations, the system may comprise one or more non-transitory electronic storage, one or more physical processor configured by machine-readable instructions, and/or other components. The machine-readable instructions may comprise one or more of a space component, a center of rotation component, a deformation component, a user interface component, and/or other components.

The non-transitory electronic storage may be configured to store information defining one or more virtual entities within one or more virtual spaces, and/or other information. Individual virtual entities may be defined by one or more of virtual bones, virtual skin, and/or other virtual space content of the individual virtual entities. Virtual skin of an individual virtual entity may be modeled as a set of vertices. The information defining one or more virtual entities may include one or more of vertex position information, skinning weight information, and/or other information. The vertex position information may comprise individual positions of individual vertices. Individual positions may include rest positions and/or deformed positions. The individual positions may be represented as vectors having vector components. The skinning weight information may include individual skinning weights of individual vertices. Individual skinning weights may convey influence of bone movement on deformation of the skin at individual ones of the vertices. By way of non-limiting illustration, one or more virtual entities may include a first virtual entity. The first virtual entity may include one or more of a first bone, a second bone, a first set of vertices defining at least part of virtual skin of the first virtual entity, and/or other virtual space content. The first set of vertices may include a first vertex and/or other vertices. The first vertex may have a rest position and/or other positions. The first vertex may have a first skinning weight.

The space component may be configured to implement one or more instances of a virtual space to determine views of the virtual space. The virtual space may include virtual space content. Virtual space content may include one or more of virtual objects, topography, and/or other virtual space content. A virtual object may include a virtual entity associated with a user of the virtual space, and/or other virtual objects. A virtual entity may be controlled by a user with which it may be associated.

The center of rotation component may be configured to determine individual centers of rotations of individual vertices of individual virtual entities. Individual centers of rotations may have individual positions represented as vectors having vector components. Individual centers of rotation may be determined with respect to individual rest positions of individual vertices. By way of non-limiting illustration, a first center of rotation may be determined for the first vertex while in the rest position.

The deformation component may be configured to determine deformed positions of individual vertices of individual virtual entities. In some implementations, deformed position may be determined based on one or more of relative movement between at least two bones, individual centers of rotation of the individual vertices, individual skinning weights of the individual vertices, and/or other information. In some implementations, the at least two bones may be positioned at or near the individual vertices. By way of non-limiting illustration, responsive to movement of the first bone relative the second bone, a first deformed position of the first vertex may be determined. The first deformed position may be determined based on one or more of the relative movement, a rest position, the first center of rotation, the first skinning weight, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
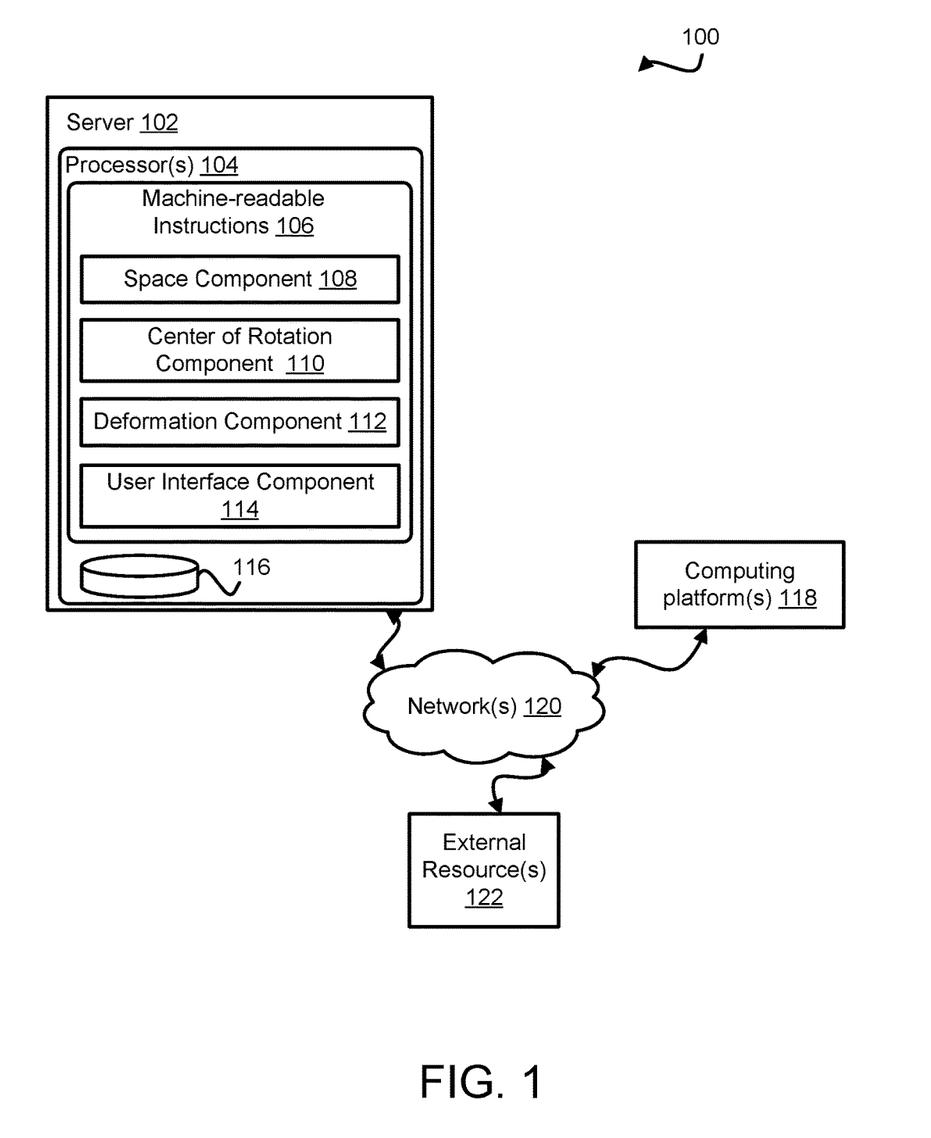
FIG. 1 illustrates a system configured for virtual entity animation, in accordance with one or more implementations.

FIG. 1 illustrates a system 100 configured for virtual entity animation, in accordance with one or more implementations. The system 100 may be configured to facilitate virtual entity animation by utilizing one or more skeletal-based skin deformation methods of animation where individual vertices on virtual skin of a virtual entity may have separate and individually determined centers of rotation.

The system 100 may include one or more of one or more servers (e.g., server 102 and/or other servers), one or more computing platforms 118, and/or other components. The server 102 may include one or more of one or more processors 104, electronic storage 116, and/or other components. The one or more processors 104 may be configured by machine-readable instructions 106. Executing the machine-readable instructions 106 may cause the one or more processors 104 to facilitate virtual entity animation. The machine-readable instructions 106 may include one or more of a space component 108, a center of rotation component 110, a deformation component 112, a user interface component 114, and/or other components.

The space component 108 may be configured to implement one or more instances of a virtual space executed by machine-readable instructions 106 to determine views of the virtual space. In some implementations, the virtual space may be hosted by server 102 such that the views may then be communicated (e.g., via streaming, via object/position data, and/or other information) from server 102 to individual computing platforms 118 for presentation to users. The view determined and presented to a given user may correspond to a virtual entity being controlled by the given user. A virtual entity may refer to a virtual object (or group of objects) present in the virtual space. The virtual entity may represent an individual user and/or other virtual objects. For example, a virtual entity may be a virtual character (e.g., an avatar) and/or other virtual objects. A group of virtual entities may include a group of virtual characters, virtual objects, and/or other content. In some implementation, a virtual entity may refer to a non-user controlled virtual object (e.g., a non-player character, or "NPC").

The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

In some implementations, the virtual space may be accessed via information stored locally at individual computing platforms (e.g., via a cartridge, disk, a memory card/stick, flash memory, electronic storage, and/or other storage). In such implementations, an individual computing platform may include one or more physical processors configured by machine-readable instructions. The machine-readable instructions of a given computing platform may include computer program components that may be the same or similar as the computer program components of machine-readable instructions 106 of server 102.

An instance of a virtual space may comprise a simulated space that is accessible by one or more users via one or more computing platforms 118 that present the views of the virtual space to the one or more users. The simulated space may include virtual space content. Virtual space content may include one or more of virtual objects, topography, and/or other virtual space content. The simulated space may express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by machine-readable instructions 106 may be synchronous, asynchronous, and/or semi-synchronous.

The above description of the manner in which views of the virtual space are determined by space component 108 is not intended to be limiting. The space component 108 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 108, users may control virtual entities, objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items and/or currency that the user can use within the virtual space.

The users may participate in the instance of the virtual space by controlling one or more of the available user controlled elements in the virtual space. User participation in the virtual space may include controlling virtual entities in the virtual space. Control may be exercised through control inputs and/or commands input by the users through computing platform(s) 102. The users may interact with each other through communications exchanged within the virtual space. Such communications may include one or more of textual chat, instant messages, private messages, voice communications, and/or other communications. Communications may be received and entered by the users via their respective computing platform(s) 102. Communications may be routed to and from the appropriate users through server(s) 102.

In some implementations, virtual objects may include virtual items and/or goods. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a virtual entity, a troop or troop type, a pet, a virtual resource, and/or other virtual items and/or goods.

In some implementations, an instance of the virtual space may be persistent. That is, the virtual space may continue on whether or not individual users are currently logged in and/or participating in the virtual space. A user that logs out of the virtual space and then logs back in some time later may find the virtual space has been changed through the interactions of other users with the virtual space during the time the user was logged out. These changes may include changes to the simulated physical space, changes in the user's inventory, changes in other user's inventories, changes experienced by non-player characters, changes to the virtual items available for use in the virtual space, and/or other changes.

The non-transitory electronic storage 116 and/or other electronic storage may be configured to store information defining a virtual space, and/or other information. The information defining the virtual space may include information defining one or more virtual entities of the virtual space, and/or other information.

In some implementations, one or more virtual entities in a virtual space may be defined by one or more models. A model of a virtual entity may define one or more of virtual skin of the virtual entity, virtual clothing of the virtual entity, virtual bones of the virtual entity, and/or virtual space content used to define the virtual entity.

Virtual bones of a virtual entity may comprise an internal anatomical structure of the virtual entity. Multiple virtual bones may be connected by one or more joints. Virtual bones may facilitate defining limbs of a virtual entity and/or other components of a virtual entity within a virtual space. In some implementations, virtual bones may be modeled as line segments and/or other representations. Relative movement of at least two bones may comprise rotation of at least one of the at least two bones about at least one joint connecting the at least two bones.

Virtual skin may surround virtual bones of a virtual entity as an exterior surface representation of the virtual entity. In some implementations, virtual skin of a virtual entity may be modeled as a set of vertices. A set of vertices may include one or more of point clouds, triangle meshes, polygonal meshes, tetrahedral meshes, subdivision meshes, low resolution cages and/or other representations. In some implementations, virtual skin may be modeled as a set of discrete polygons. Multiple polygons may be linked together to form a polygonal mesh. Individual polygons may be defined by individual sets of vertices. In some implementations, a polygon may have an area formed from at least three vertices. In some implementations, a polygon having three vertices may form a triangle.

In some implementations, information defining one or more virtual entities may include one or more of vertex position information, skinning weight information, and/or other information.

Vertex position information may comprise individual positions of individual vertices of individual virtual entities. Individual positions may include one or more of rest positions (also referred to as "rest pose"), deformed positions, intermediate positions, and/or other positions. Individual positions of individual vertices may be represented as vectors having vector components, and/or other components. The vector components may be defined with respect to a coordinate system that corresponds to dimensions of a virtual space. A coordinate system may include one or more of Cartesian, polar, cylindrical, spherical, and/or other coordinate systems. A coordinate system may have an origin within the dimensions of a space.

In a three-dimensional space, vector components defining a position of a vertex may comprise one or more of a first vector component, a second vector component, a third vector component, and/or other vector components. In a Cartesian coordinate system, individual ones of the first vector component, the second vector component, and the third vector component may comprise respective ones of an x-component, y-component, a z-component, and/or other components.

It is noted that the above description of vector components being specified with respect to a three-dimensional Cartesian coordinate system is provided for illustrative purposes only and is not to be considered limiting. For example, in some implementations, vector components may be expressed in other ways.

In some implementations, skinning weight information may include individual skinning weights of individual vertices, and/or other information. Individual skinning weights may convey an influence of bone movement on deformation of individual vertices. Deformation of an individual vertex may include one or more of translation of the individual vertex, rotation of the individual vertex, and/or other influence. Rotation of a vertex may be with respect to a center of rotation for the vertex (see, e.g., center of rotation component 110 in FIG. 1). By way of non-limiting illustration, a virtual entity may be deformed by rotation of a pair of bones around a joint that connects the bones. Individual ones of the bones may propagate its transformation to the skin it supports. The skin deformation may appear near the joints where an area of the virtual skin may be influenced by the transformations of two or more bones. A skinning weight of a vertex may comprise a scaling factor that conveys how much rotation and/or translation may be experienced by the vertex in response to movement of a bone relative at least one other bone (e.g., about a joint connecting the bones).

Figure 2:
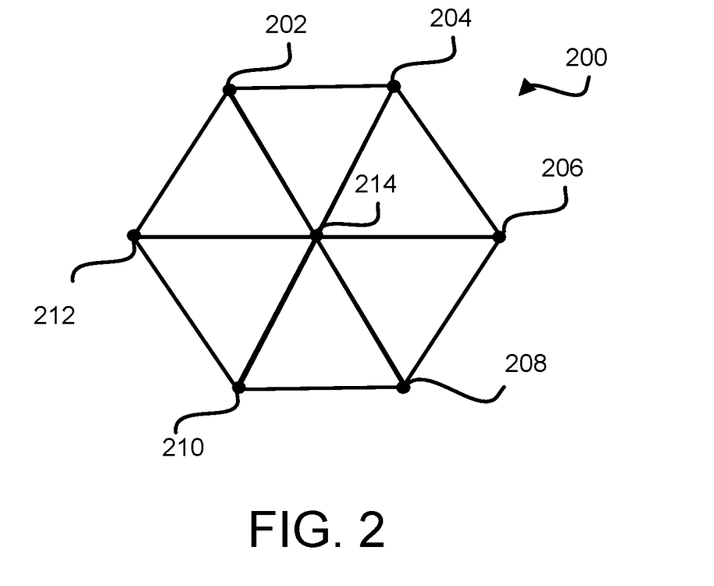
FIG. 2 illustrates an exemplary set of vertices used to model virtual skin of a virtual entity.

By way of non-limiting illustration in FIG. 2, an exemplary virtual skin model is shown. The model 200 may include a set of vertices. The set of vertices may include one or more of a first vertex 202, a second vertex 204, a third vertex 206, a fourth vertex 208, a fifth vertex 210, a sixth vertex 212, a seventh vertex 214, and/or other vertices. In some implementations, a subset of vertices may form a polygon. A set of polygons may be linked together to form a polygonal mesh that may be representative of virtual skin on a virtual entity. Individual ones of the vertices in model 200 may have positions within a simulated space. Individual positions of individual vertices may be represented as vectors having vector components, and/or other components. Individual ones of the vertices in model 200 may have one or more skinning weights associated therewith. It is noted that the depiction in FIG. 2 is for illustrative purposes only and is not to be considered limiting. For example, in some implementations, a model of virtual may be comprised of hundreds, thousands, and/or tens of thousands of individual vertices and/or discrete polygons to form the model.

Returning to FIG. 1, the center of rotation component 110 may be configured to determine individual centers of rotations for individual vertices on virtual skin of individual virtual entities. Individual centers of rotations may have individual positions represented as vectors having vector components. The individual centers of rotation may be determined with respect to individual rest positions of the individual vertices.

Returning to FIG. 1, in some implementations, individual centers of rotation may be determined based on similarity measures determined between individual skinning weights of individual vertices of individual virtual entities, and/or other information. A similarity measure may convey, for a pair of vertices having respective skinning weights, a degree in which the pair of vertices may have the same or similar transformation and/or deformation responsive to bone movement. For example, two vertices with similar skinning weights may be assumed to follow a similar transformation. In some implementations, a similarity measure may be expressed as a numerical value on a scale. For example, a similarity measure scale may comprise values in a range of "0" to "1," and/or other ranges. A value of "0" may convey that there may be no degree of similarity; a value of "1" may convey that a transformation and/or deformation may be the same; and values there between may convey varying degrees thereof.

In some implementations, a similarity measure may be determined in a pairwise manner. For example, a similarity measure may be determined by comparing skinning weight values for a pair of vertices. Based on the skinning weights values being the same, having a particular difference in value, and/or being within a threshold range, a similarity measure may be determined. By way of non-limiting illustration, a look up table and/or other specification may specify particular similarity measures based on a comparison (e.g., differences) of a pair of skinning weight values.

In some implementations, a similarity measure, $s(w_p, w_v)$, between two skinning weights of vertices p and v, may be determined based on an aggregate of contribution a set of bones (in some implementations, all bones in a model) may have on transformation of the two vertices, and/or other information. By way of non-limiting illustration, function for determining a similarity measure, $s(w_p, w_v)$, between two skinning weights of vertices p and v, may be expressed as:

$$s(w_p, w_v) = \sum_{\forall j \neq k} w_{pj} w_{pk} w_{vj} w_{vk} e^{-\frac{(w_{pj}w_{vk} - w_{pk}w_{vj})^2}{\sigma^2}},$$

where the pair of j and k represent possible combinations of two different bones in the set of bones; the product of weights $w_{pj} w_{pk} w_{vj} w_{vk}$ represents contributions of bone j and bone k; the difference $w_{pj}w_{vk} - w_{pk}w_{vj}$ represents a distance in a normalized skinning weight space; and the parameter σ may control the width of the exponential kernel. Two pairs of skinning weights $(w_{pj}, w_{pk})$ and $(w_{vj}, w_{vk})$ may be similar if $w_{pj}:w_{pk} \approx w_{vj}:w_{vk}$, or $w_{pj}w_{vk} \approx w_{pk}w_{vj}$.

By way of non-limiting illustration, considering a portion of a virtual entity having three bones such that skinning weights for individual vertices surrounding the bones may comprise a three-dimensional vector (e.g., a skinning weight for each of the three bones). Following this illustration, consider three vertices, vertex A, vertex B, and vertex C. Vertex A may have skinning weights of (0, 0.3, 0.7), with "0" being the skinning weight for the first bone, "0.3" being the skinning weight for the second bone, and "0.7" being the skinning weight for the third bone. Vertex B may have skinning weights of (0, 0.4, 0.6). Vertex C may have skinning weights of (0.9, 0.1, 0). A similarity measure may convey that vertex A and vertex B may have more similar transformations than vertex A or B with vertex C.

In some implementations, center of rotation component 110 may be configured such that determining individual centers of rotations may comprise one or more of: determining similarity measures between individual vertices of an individual virtual entity; determining an aggregate of weighted positions of individual vertices, wherein individual positions of individual vertices may be weighted based on individual similarity measures; dividing the aggregate of weighted positions by an aggregate of the individual similarity measures; and/or other operations.

By way of non-limiting illustration, a function for determining a center of rotation, p*, for a given vertex, p, may be expressed as:

$$p^* = \frac{\int_{v \in \Omega} s(w_p, w_v) v \, dv}{\int_{v \in \Omega} s(w_p, w_v) dv}.$$

The numerator in the above equation may represent an aggregate of positions of vertices, v, included in a set of vertices in a model, Ω, with individual positions being weighted by a similarity measure (e.g., a scalar value) determined between the skinning weights of the individual positions and the skinning weight of the given vertex, p. The denominator may represent an aggregate of the individual similarity measures determined between the skinning weight of the given vertex, p, and skinning weights of individual ones of the vertices, v, included in the set of vertices in the model, Ω.

In some implementations, the model, Ω, may be represented by a set of triangles (or other polygons), T. Individual triangles, $t_{\alpha\beta\gamma}$ in the set, T, may have vertices α, β, and γ. The center of rotation component 110 may be configured such that determining individual centers of rotations of individual vertices of individual triangles may comprise one or more of: determining areas of individual triangles; determining similarity measures between skinning weights of individual vertices and average skinning weights of individual triangles; determining an aggregate of weighted positions of centroids of individual triangles, wherein individual positions of centroids of individual triangles may be weighted based on individual similarity measures; dividing the aggregate of weighted positions by an aggregate of the individual similarity measures; and/or other operations.

By way of non-limiting illustration, a function for determining a center of rotation, $p^*_i$, for a given vertex, $v_i$, may be expressed as:

$$p^*_i = \frac{\sum_{t_{\alpha\beta\gamma}\in T} s\left(w_i, \frac{w_\alpha + w_\beta + w_\gamma}{3}\right) \frac{v_\alpha + v_\beta + v_\gamma}{3} a_{\alpha\beta\gamma}}{\sum_{t_{\alpha\beta\gamma}\in T} s\left(w_i, \frac{w_\alpha + w_\beta + w_\gamma}{3}\right) a_{\alpha\beta\gamma}}.$$

The numerator may represent an aggregate over all triangles $t_{\alpha\beta\gamma}$, in the set, T, of individual centroids of individual triangles, $$\frac{v_\alpha + v_\beta + v_\gamma}{3},$$

weighted by individual similarities measures determined between the skinning weight of the given vertex, $w_i$, and individual average skinning weights of individual triangles, $$\frac{w_\alpha + w_\beta + w_\gamma}{3},$$

multiplied by individual areas, $a_{\alpha\beta\gamma}$, of the individual triangles. The denominator may represent an aggregate of individual similarity measures determined between the skinning weight of the given vertex, p, and individual average skinning weights of individual triangles, $$\frac{w_\alpha + w_\beta + w_\gamma}{3},$$

multiplied by individual areas, $a_{\alpha\beta\gamma}$, of the individual triangles.

It some implementations, processing time for determining individual centers of rotation may be high (e.g., up to an hour) for a virtual skin model with tens of thousands or more vertices. To accelerate the processing time, one or more processing time saving techniques may be employed. One or more processing time saving techniques may include one or more of parallel processing, performing an approximate nearest neighbor (ANN) search, applying a smooth skinning weight assumption, and/or other techniques.

In some implementations, a parallel processing technique may take into account that because individual centers of rotation for individual vertices may be determined independently, a set of multiple centers of rotation for a set of multiple vertices may be determined in parallel. In some implementations, an order in which centers of rotation may be determined may be randomized to balance processor workload between different computing cores.

In some implementations, an approximate nearest neighbor (ANN) search may, for individual vertices, i, with individual skinning weights, $w_i$, query vertices, j, with a similar skinning weight, $w_j$, that satisfy the criteria $\|w_i - w_j\|_2 < \omega$, and/or other criteria. Vertices, j, may be used as seeds for a smooth skinning weights assumption. The search may be accelerated by clustering vertices in a skinning weight space using maximized minimum distance point sets as centers of the clusters. The clusters may be used to quickly reject distant vertices. In some implementations, $\sqrt{n}$ clusters may be used, where n may be the quantity of vertices in an individual model.

In some implementations, input skinning weights may be assumed to be smooth on the surface of individual virtual skin models. Using this assumption, a breadth-first search may be performed a triangle adjacency graph, starting from triangles adjacent to the seed vertices in the previous step. Expanding the search may stop if a similarity is smaller than a threshold.

Figure 3:
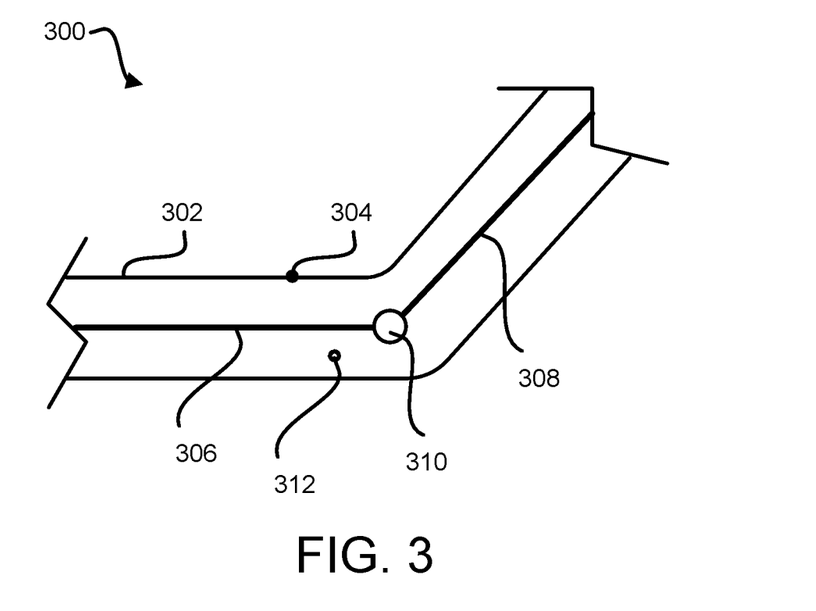
FIG. 3 illustrates a cross section of virtual bones connected by a joint and a center of rotation determined for a vertex on virtual skin that surrounds the virtual bones.

FIG. 3 illustrates a cross sectional view of a portion 300 of a virtual entity. The portion 300 may include one or more of a first bone 306, a second bone 308, a joint 310 connecting first bone 306 and second bone 308, virtual skin 302 modeled by a set of vertices, and/or other components. The set of vertices of virtual skin 302 may include a first vertex 304. In some implementations, center of rotation component 110 (FIG. 1) may be configured to determining a center of rotation 312 of first vertex 304. The center of rotation 312 may have a position that may not coincide with a position of joint 310. It is noted that the positioning of center of rotation 312 is shown for illustrative purposes only and not to be considered limiting as center of rotation 312 may be positioned in other locations.

Returning to FIG. 1, deformation component 112 may be configured to determined deformed positions of individual vertices. Deformed positions may be determined responsive to relative movement between at least two bones positioned at or near the individual vertices, and/or other bone movement. Deformed positions may be determined based on one or more of individual centers of rotation of individual vertices, individual rest positions of individual vertices, individual skinning weights, and/or other information.

In some implementations, deformed positions may be determined using one or more skin deformation methods that use one or more of individual centers of rotation of individual bones or groups of bones, rest positions of individual vertices, individual skinning weights of individual vertices, and/or other information as inputs and provide deformed positions as outputs. One or more skin deformation methods may include one or more of linear blend skinning (LBS), dual quaternion skinning (DQS), spherical blend skinning (SBS), linear interpolation of quaternions (QLERP), spherical linear interpolation (SLERP), and/or other methods. Two notable differences between techniques presented herein and one or more skin deformation methods may be first, that the centers of rotation are computed on a per-vertex basis, and second, the centers of rotation are pre-computed at the rest pose and not at runtime.

The user interface component 114 may be configured to effectuate presentation of one or more user interfaces via one or more computing platforms 118. A user interface may be configured to obtain user entry and/or selection of adjustments to individual positions of individual centers of rotation of individual vertices of individual virtual entities. In some implementations, a user interface may be configured to present a graphical representation of virtual entity including visualization of one or more of virtual bones, joints, virtual skin, individual points corresponding to individual centers of rotation, individual points corresponding to individual vertices on a virtual skin model of a virtual entity, and/or other features. A user interface may be configured to obtain user entry and/or selection of adjustments to individual positions of individual centers of rotation through one or more user entry and/or selection techniques. One or more user entry and/or selection techniques may include one or more of drag-and-drop, text box input, and/or other techniques. By way of non-limiting illustration, user may drag-and-drop individual points to individual centers of rotation and/or sets of points corresponding to sets of centers of rotation from positions determined by, e.g., center of rotation component 110, to adjusted positions.

Figure 4:
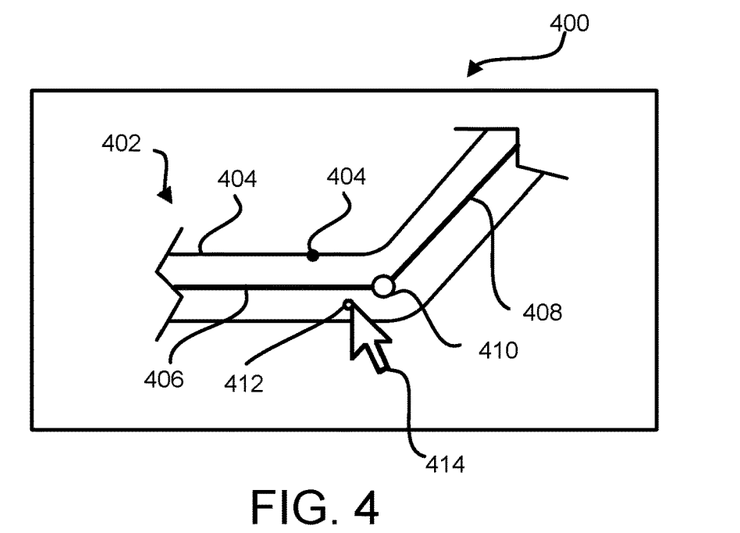
FIG. 4 illustrates an exemplary user interface for making changes to centers of rotation determining for individual vertices of a virtual space model, in accordance with one or more implementations.

By way of non-limiting illustration in FIG. 4, an exemplary user interface 400 configured for obtaining user entry and/or selection of adjustments to individual positions of individual centers of rotation of individual vertices of individual virtual entities is shown. The user interface 400 may be configured for presentation on individual displays of individual computing platforms. The user interface 400 may be configured to present individual virtual entities and/or portions of virtual entities, e.g., portion 400 of a virtual entity. Display of portion 400 may include visualization of one or more of virtual bones, joints, virtual skin, individual points corresponding to individual centers of rotation, individual points corresponding to individual vertices on a virtual skin model of a virtual entity, and/or other features. The virtual bones may include one or more of a first bone 406, a second bone 408, and/or other bones. The joints may include a joint 410 connecting first bone 406 to second bone 408, and/or other joints. The virtual skin may include skin 404. The individual points corresponding to individual vertices on virtual skin may include a first point 404 corresponding to a vertex on skin 404. The individual points corresponding to individual centers of rotation may include a second point 412 corresponding to a first center of rotation for the vertex represented by first point 404. A user may provide entry and/or selection of adjustments to position of second point 412 to adjust the position of the first center of rotation corresponding to second pint 412. By way of non-limiting illustration, a user may provide a drag-and-drop entry and/or selection using a cursor 414.

Returning to FIG. 1, server 102, computing platform(s) 118, and/or external resources 122 may be operatively linked via one or more electronic communication links. For example, such electronic communication links may be established, at least in part, via a network (e.g., network(s) 120) such as the Internet and/or other networks. It will be appreciated that this is not intended to be limiting and that the scope of this disclosure includes implementations in which server 102, computing platforms 118, and/or external resources 122 may be operatively linked via some other communication media.

The external resources 122 may include sources of information that are outside of system 100, external entities participating with system 100, and/or other resources. In some implementations, some or all of the functionality attributed herein to external resources 122 may be provided by resources included in system 100.

Server 102 may include electronic storage 116, one or more processors 104, and/or other components. Server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 116 may comprise electronic storage media that electronically stores information. The electronic storage media of the electronic storage may include one or both of storage that is provided integrally (i.e., substantially non-removable) with the respective device and/or removable storage that is removably connectable to server 102. Removable storage may include, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store files, software algorithms, information determined by processor(s), and/or other information that enables server 102 to function as described herein.

Processor(s) 104 is configured to provide information-processing capabilities in the server 102. As such, processor(s) 104 may include one or more of a digital processor, an analog processor, a digital circuit designed to process information, an analog circuit designed to process information, a state machine, and/or other mechanisms for electronically processing information. Although the processor(s) 104 are shown in FIG. 1 as single entity within the server 102, this is for illustrative purposes only. In some implementations, the processor(s) 104 may include one or more processing units. These processing units may be physically located within the same device or may represent processing functionality of a plurality of devices operating in coordination.

For example, processor(s) 104 may be configured to execute machine-readable instructions 106 including components 108, 110, 112, and/or 114. Processor(s) 104 may be configured to execute components 108, 110, 112, and/or 114 by software; hardware; firmware; some combination of software, hardware, and/or firmware; and/or other mechanisms for configuring processing capabilities on processor(s) 104. It should be appreciated that, although components 108, 110, 112, and/or 114 are illustrated in FIG. 1 as being co-located within a single processing unit, in implementations in which processor 104 includes multiple processing units, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114 and/or other components.

Figure 5:
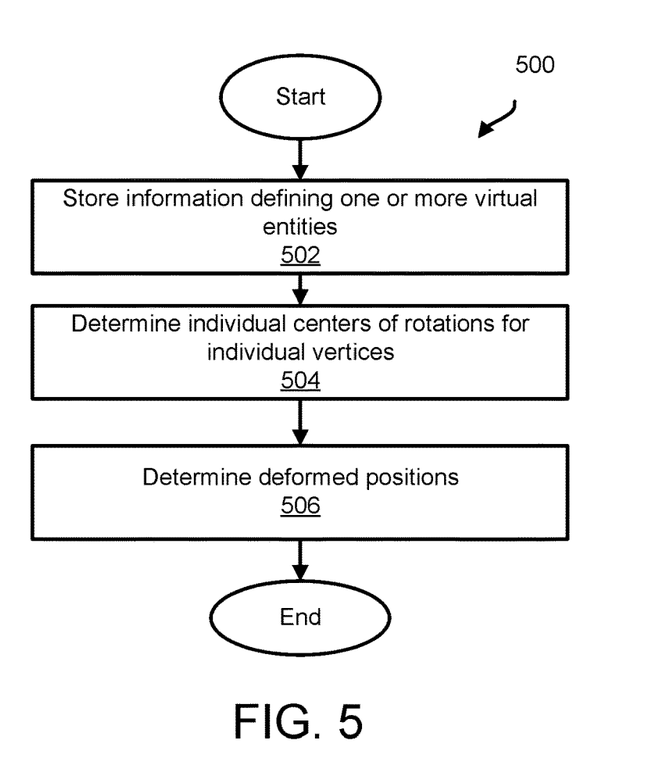
FIG. 5 illustrates method of virtual entity animation, in accordance with one or more implementations.

FIG. 5 illustrates an implementation of a method 500 of storing information defining a virtual space in a compressed format. The operations of method 500 presented below are intended to be illustrative. In some implementations, method 500 may be accomplished with one or more additional operations not described and/or without one or more of the operations discussed. Additionally, the order in which the operations of method 500 are illustrated in FIG. 5 and described below is not intended to be limiting.

In some implementations, method 500 may be implemented in one or more processing devices (e.g., a computing platform, a digital processor, an analog processor, a digital circuit designed to process information, an analog circuit designed to process information, a state machine, and/or other mechanisms for electronically processing information)

and/or one or more other components. The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 500.

Referring now to method 500 in FIG. 5, at an operation 502, information defining one or more virtual entities of a virtual entity may be stored. Individual virtual entities may be defined by one or more of virtual bones, virtual skin, and/or other virtual space content. The virtual skin of an individual virtual entity may be modeled as a set of vertices. The information defining one or more virtual entities may include one or more of vertex position information, skinning weight information, and/or other information. The vertex position information may comprise individual positions of individual vertices, and/or other information. Individual positions may be represented as vectors having vector component. Skinning weight information may include individual skinning weights of individual vertices of individual virtual entities. Individual skinning weights of individual vertices may convey influence of bone movement on deformation of individual vertices. By way of non-limiting illustration, the one or more virtual entities may include a first virtual entity. The first virtual entity may include one or more of a first bone, a second bone, a first set of vertices modeling skin of the first virtual entity, and/or other virtual space content. The first set of vertices may include a first vertex. The first vertex may have a rest position, a first skinning weight, and/or features. In some implementations, operation 502 may be performed with non-transitory electronic storage the same as or similar to non-transitory electronic storage 116, and/or other components (shown in FIG. 1 and described herein).

At an operation 504, individual centers of rotations for the individual vertices may be determined. Individual centers of rotations may have individual positions represented as vectors having vector components. The individual centers of rotation may be determined with respect to individual rest positions of the individual vertices. By way of non-limiting illustration, a first center of rotation may be determined for the first vertex in the rest position. In some implementations, operation 504 may be performed by one or more physical processors executing a center of rotation component the same as or similar to center of rotation component 110 (shown in FIG. 1 and described herein).

At an operation 506, deformed positions of the individual vertices may be determined responsive to relative movement between at least two bones. The deformed positions of individual vertices may be determined based on one or more of individual centers of rotation of the individual vertices, individual skinning weights, and/or other information. By way of non-limiting illustration, responsive to movement of the first bone relative the second bone, a first deformed position of the first vertex may be determined. The first deformed position may be determined based on one or more of the first center of rotation, the first skinning weight, and/or other information. In some implementations, operation 506 may be performed by one or more physical processors executing a deformation component the same as or similar to deformation component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate animation and rendering of virtual entities, the system comprising:
   non-transitory electronic storage storing information defining one or more virtual entities, individual virtual entities being defined by virtual skin, virtual bones, and virtual joints, the virtual bones and the virtual joints being used to animate the virtual skin, the virtual skin of an individual virtual entity being modeled as a set of vertices that moves according to the animation of the virtual entity, the set of vertices including a first vertex, the information defining the one or more virtual entities including skin rest position information and skinning weight information, the skin rest position information conveying individual rest positions of the individual vertices, the skinning weight information conveying influence of virtual bone movement on deformation of individual vertices based on individual skinning weights computed for the individual vertices such that a first skinning weight is computed for the first vertex; and
   one or more physical processors configured by machine-readable instructions to:
      determine individual centers of rotations for the individual vertices, the individual centers of rotations having individual positions represented as vectors having vector components, the individual centers of rotation being determined with respect to the individual rest positions of the individual vertices, such that a first center of rotation is determined for the first vertex while in a first rest position; and
      determine deformed positions of the individual vertices responsive to specification of animated motion, the deformed positions being determined based on the individual centers of rotation of the individual vertices, the individual skinning weights, and the animated motion;
      wherein determining the first center of rotation comprises:
         determining an aggregate of weighted positions of the vertices in the set of vertices, individual positions of the vertices in the set of vertices being weighted based on individual similarity measures determined between the first skinning weight of the first vertex and the individual skinning weights of the individual vertices in the first set of vertices; and
         dividing the aggregate of weighted positions by an aggregate of the individual similarity measures.

2. The system of claim 1, wherein the similarity measures between the skinning weights are determined by comparing the skinning weights.

3. The system of claim 2, wherein an individual similarity measure conveys, for a pair of vertices having respective skinning weights, a degree to which the pair of vertices may have the same or similar transformation responsive to bone movement.

4. The system of claim 1, wherein:
the virtual bones of an individual virtual entity are connected by the virtual joints; and
relative movement of at least two bones comprises rotation of at least one of the at least two bones about at least one joint connecting the at least two bones.

5. The system of claim 1, wherein individual deformed positions of individual vertices are determined based on one or both of a translation or a rotation from individual resting positions.

6. The system of claim 1, wherein the one or more physical processors are further configured by machine-readable instructions to:
effectuate presentation of a user interface, the user interface being configured to obtain user entry and/or selection of changes to the individual positions of the individual centers of rotation of the individual vertices.

7. The system of claim 6, wherein the user entry and/or selection is provided via a drag-and-drop entry and/or selection technique.

8. The system of claim 1, wherein the one or more physical processors are further configured by machine-readable instructions to determine multiple centers of rotations for multiple vertices in parallel.

9. A method of animation and rendering of virtual entities, the method being implemented in a computer system comprising one or more physical processor and non-transitory storage media storing machine-readable instructions, the method comprising:
storing information defining one or more virtual entities, individual virtual entities being defined by virtual skin, virtual bones, and virtual joints, the virtual bones and the virtual joints being used to animate the virtual skin, the virtual skin of an individual virtual entity being modeled as a set of vertices that moves according to the animation of the virtual entity, the set of vertices including a first vertex, the information defining the one or more virtual entities including skin rest position information and skinning weight information, the skin rest position information conveying individual rest positions of the individual vertices, the skinning weight information conveying influence of virtual bone movement on deformation of individual vertices based on individual skinning weights computed for the individual vertices such that a first skinning weight is computed for the first vertex; and
determining individual centers of rotations for the individual vertices, the individual centers of rotations having individual positions represented as vectors having vector components, the individual centers of rotation being determined with respect to the individual rest positions of the individual vertices, such that a first center of rotation is determined for the first vertex while in a first rest position; and
determining deformed positions of the individual vertices responsive to specification of animated motion, the deformed positions being determined based on the individual centers of rotation of the individual vertices, the individual skinning weights, and the animated motion;
wherein determining the first center of rotation comprises:
determining an aggregate of weighted positions of the vertices in the set of vertices, individual positions of the vertices in the set of vertices being weighted based on individual similarity measures determined between the first skinning weight of the first vertex and the individual skinning weights of the individual vertices in the first set of vertices; and
dividing the aggregate of weighted positions by an aggregate of the individual similarity measures.

10. The method of claim 9, wherein the similarity measures between the skinning weights are determined by comparing the skinning weights.

11. The method of claim 10, wherein an individual similarity measure conveys, for a pair of vertices having respective skinning weights, a degree to which the pair of vertices may have the same or similar transformation responsive to bone movement.

12. The method of claim 9, wherein:
the virtual bones of an individual virtual entity are connected by the virtual joints; and
relative movement of at least two bones comprises rotation of at least one of the at least two bones about at least one joint connecting the at least two bones.

13. The method of claim 9, wherein individual deformed positions of individual vertices are determined based on one or both of a translation or a rotation from individual resting positions.

14. The method of claim 9, further comprising:
effectuating presentation of a user interface, the user interface being configured to obtain user entry and/or selection of changes to the individual positions of the individual centers of rotation of the individual vertices.

15. The method of claim 14, wherein the user entry and/or selection is provided via a drag-and-drop entry and/or selection technique.

16. The method of claim 9, further comprising determining multiple centers of rotations for multiple vertices in parallel.

* * * * *